(12) United States Patent
Saeki

(10) Patent No.: US 6,899,220 B2
(45) Date of Patent: May 31, 2005

(54) BEADED CONVEYOR BELT

(75) Inventor: Naoyuki Saeki, Yamatokohriyama (JP)

(73) Assignee: Nitta Corporation, Osaka (JP)

(*) Notice: Subject to any disclaimer, the term of this patent is extended or adjusted under 35 U.S.C. 154(b) by 0 days.

(21) Appl. No.: 10/477,665
(22) PCT Filed: May 8, 2002
(86) PCT No.: PCT/JP02/04503
§ 371 (c)(1), (2), (4) Date: Nov. 11, 2003
(87) PCT Pub. No.: WO02/092477
PCT Pub. Date: Nov. 21, 2002

(65) Prior Publication Data
US 2004/0144625 A1 Jul. 29, 2004

(30) Foreign Application Priority Data
May 11, 2001 (JP) .................................. 2001-141522

(51) Int. Cl.⁷ ............................................. B65G 21/16
(52) U.S. Cl. .................................... 198/831; 198/840
(58) Field of Search ............................... 198/831, 840, 198/842

(56) References Cited

U.S. PATENT DOCUMENTS

| | | | | |
|---|---|---|---|---|
| 3,838,767 A | * | 10/1974 | Taylor | 198/815 |
| 3,901,379 A | * | 8/1975 | Bruhm | 198/831 |
| 4,955,466 A | * | 9/1990 | Almes et al. | 198/831 |
| 5,360,102 A | * | 11/1994 | Schoning | 198/831 |

FOREIGN PATENT DOCUMENTS

| | | |
|---|---|---|
| EP | 0 716 034 A1 | 12/1996 |
| JP | 47-12017 B1 | 4/1972 |
| JP | 08-231016 A1 | 9/1996 |

OTHER PUBLICATIONS

Microfilm of the specification and drawings annexed to the request of Japanese Utility Model Application No. 90260/1979 (Laid-open No. 10413/1981)(Mariyatto Handling Ltd.), Jan. 29, 1981.

Microfilm of the specification and drawings annexed to the request of Japanese Utility Model Application No. 105853/1997 (Laid-open No. 69990/1978)(Marryat Finance Ltd.), Jun. 12, 1978; Patent Abstracts of the United States Patent No. 3,901,379 issued on Aug. 26, 1975 for JP53–69990 published on Jun. 12, 1978.

Microfilm of the specification and drawings annexed to the request of Japanese Utility Model Application No. 110494/1977 (Laid-open No. 37690/1979 (Kabushiki Kaisha Kawasaki Seisakusho), Mar. 12, 1979.

Microfilm of the specification and drawings annexed to the request of Japanese Utility Model Application No. 117897/1985 (Laid-open No. 26310/1987)(Mitsuboshi Belting Ltd.), Feb. 18, 1987.

(Continued)

Primary Examiner—Lesley D. Morris
Assistant Examiner—Mark Deuble
(74) Attorney, Agent, or Firm—Darby & Darby

(57) ABSTRACT

In a curved conveyor with end rollers disposed at a certain angle between which a belt body is stretched, a plurality of bead constituting elements is detachably disposed along the outer peripheral end of the belt body. Alternatively, in a linear conveyor with end rollers disposed in parallel between which a conveyor belt body is stretched, a plurality of bead constituting elements is detachably disposed along both ends of the belt body. In these conveyor belts, only damaged bead constituting elements may be readily replaced.

24 Claims, 15 Drawing Sheets

OTHER PUBLICATIONS

Microfilm of the specification and drawings annexed to the request of Japanese Utility Model Application No. 123186/1982 (Laid–open No. 30009/1984)(Toyota Industries Corp.), Feb. 24, 1984.

Patent Abstracts of Japan for JP08–231016 published on Sep. 10, 1996.

CD–ROM of the specification and drawings annexed to the request of Japanese Utility Model Application No. 109975/1991 (Laid–open No. 49721/1993)(Mitsuboshi Belting Ltd.), Jun. 29, 1993.

Microfilm of the specification and drawings annexed to the request of Japanese Utility Model Application No. 108631/1990 (Laid–open No. 65208/1992)(Nippon Polymer Kabushiki Kaisha), Jun. 5, 1992.

Application No. 13213/1986 (Laid–open No. 128008/1987)(Sanki Kogyo Kabushiki Kaisha), Aug. 13, 1987.

* cited by examiner

US 6,899,220 B2

BEADED CONVEYOR BELT

This application is a national phase application under 35 U.S.C. § 371 of International Application No. PCT/JP02/04503, filed May 8, 2002 which claims prority to Japanese Application No. 2001-141522, filed May 11, 2001 and is incorporated herein in its entirety.

FIELD OF THE INVENTION

The present invention relates to a beaded conveyor belt used in a curved conveyor or a linear conveyor.

PRIOR ART

A curved conveyor, as illustrated in FIG. 14, is generally formed by stretching a conveyor belt 90 between end rollers 92 and 92 disposed at a certain angle and provided on a conveyor body 91. The conveyor belt 90, as shown in FIG. 15, has a urethane rubber bead 93 melted and welded together with the outer hem area. In order to prevent the inward shift due to a centripetal force during the rotation, the bead 93 is engaged with a guide members 94 attached to the conveyor body 91. The guide member of this type is generally disposed as shown in FIG. 15. A pair of bearings BR and BR is attached to a block B in a fashion that they are symmetrically inclined with respect of the horizontal plane. And a thick portion 93a of the bead 93 is held between the bearings BR and BR.

During the rotation of this conveyor belt, the bead 93 is affected by bending force at the time of configuration change along with the outer peripheral configuration of the end roller 92 and tensile force from the guide members, and thereby causing crack and/or breakage on the thick portion 93a of the bead 93 in a relatively short time period. Although replacement of the bead 93 may allow to re-use the belt, in the above conveyor belt, such replacement is not possible and there is no way but to abandon the conveyor belt. This holds true in case of a linear conveyor in which beads are sewed to both hem sides for prevention of meander of the belt.

Therefore in the field handling conveyor belts of this type, there has been a serious demand for a beaded conveyor belt in which only a damaged bead potion may be readily replaced.

It is hence an object of the present invention to provide a beaded conveyor belt in which only a damaged bead portion may be readily replaced.

SUMMARY OF THE INVENTION

In a beaded conveyor belt of the present invention, a large number of bead constituting elements are detachably disposed along an outer peripheral end part of a belt body of a curved conveyor stretched between end rollers disposed at a certain angle.

In a beaded conveyor belt of the present invention, alternatively, a plurality of bead constituting elements are detachably disposed along both ends of a belt body of a linear conveyor stretched between end rollers disposed in parallel.

In the beaded conveyor belt of the present invention, the bead constituting elements may be detachably attached on the belt body by sewing, pinning or with an engagement by means of a claw.

Further in the beaded conveyor belt of the present invention, any adjacent bead constituting elements may be connected with a thin piece.

The above and other objects and advantages of the present invention will be apparent from the following description read in conjunction with the accompanying drawings.

DETAILED DESCRIPTION OF THE INVENTION

Figure 1:
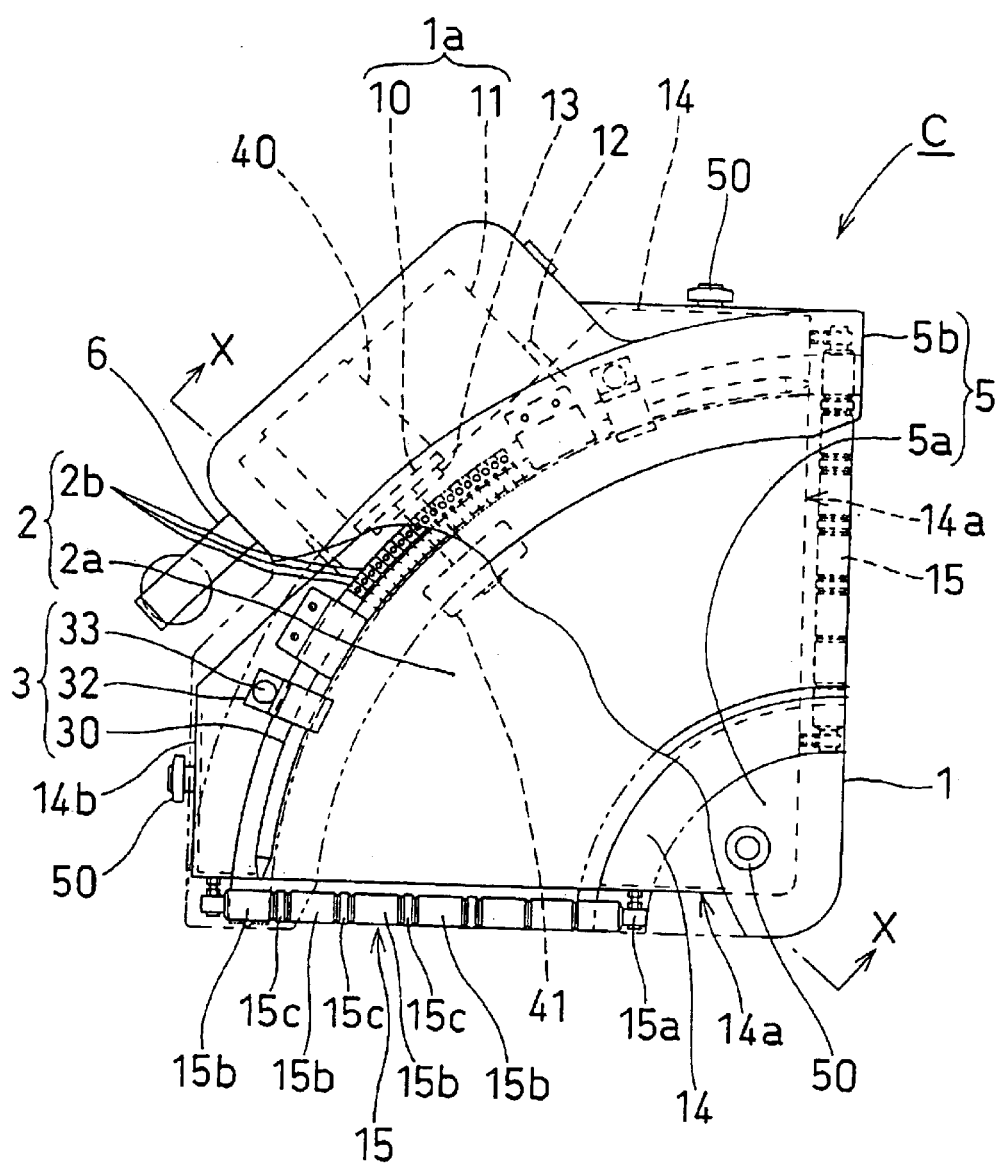
FIG. 1 is a plane view of a curved conveyor employing a beaded conveyor belt according to an embodiment of the present invention.
Figure 2:
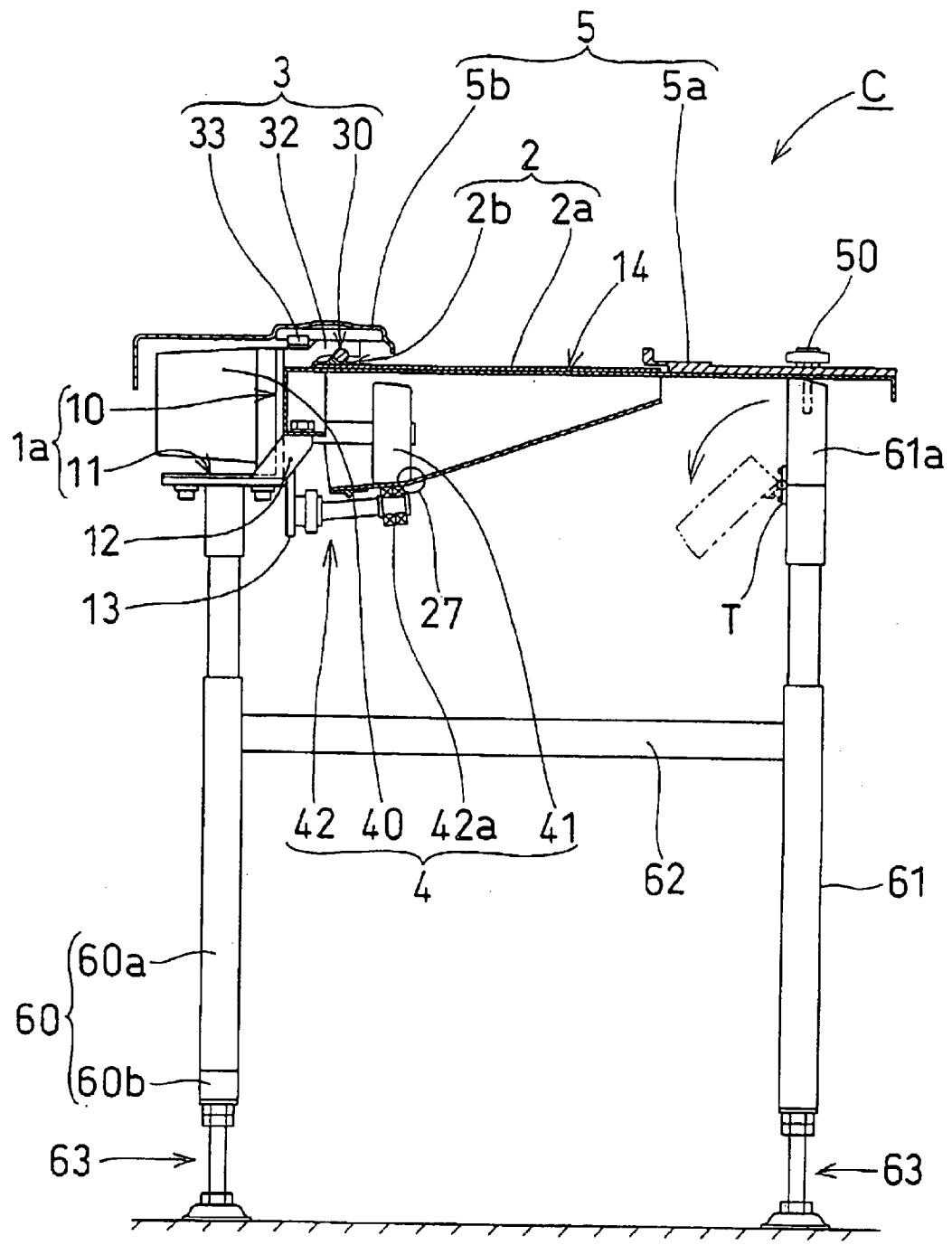
FIG. 2 is a sectional view taken along the line X—X of FIG. 1.

FIG. 1 shows a plane view of a conveyor C which employs a beaded conveyor belt 2 according to this invention. FIG. 2 is a sectional view taken along the line X—X in FIG. 1, and FIG. 3 is a bottom view of the conveyor C.

Figure 3:
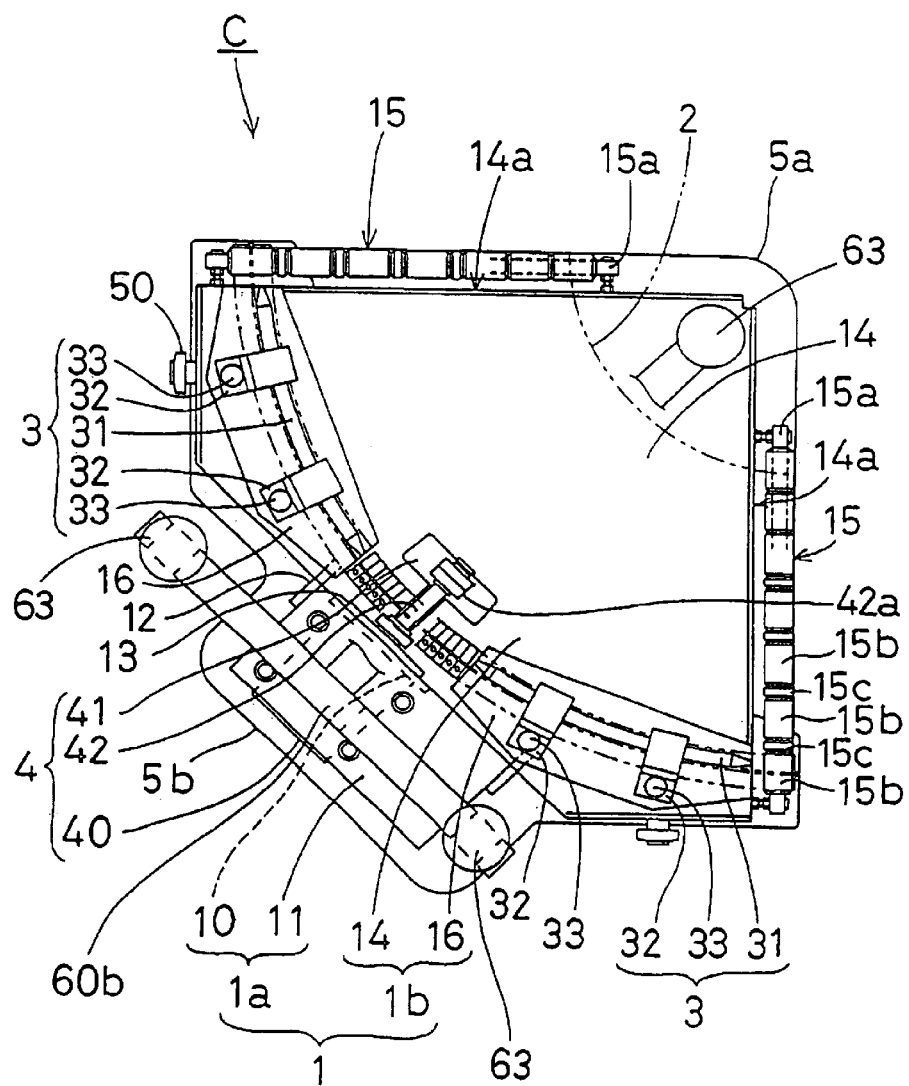
FIG. 3 is a bottom view of the belt conveyor.

A basic constitution of this conveyor C is shown in FIGS. 1 to 3. The conveyor C includes a conveyor main body 1, a beaded conveyor belt 2 stretched on the conveyor main body 1, a shift prevention member 3 for preventing the beaded conveyor belt 2 from shifting inwardly, a driving member 4 for rotationally driving the beaded conveyor belt 2. The conveyor C also includes a cover member 5 which covers a motor 40 with a decelerator for the driving member 4, the shift prevention member 3 on the upper side and an inner and an outer peripheral portion of the beaded conveyor belt 2, and a leg member 6 which keeps the conveyor main body 1 at a suitable height. These main parts of the conveyor C will be described in detail below.

The conveyor main body 1, as shown in FIG. 1, includes a motor support element 1a, and a belt support element 1b bolted to the motor support element 1a.

As shown in FIGS. 2 and 3, the motor support element 1a is composed of a motor mounting plate 10 and a base plate 11 provided on the upper end of the leg member 6, and formed in an L-shape in a side view. The base plate 11 has bracket portions 12 at both end portions thereof. The motor mounting plate 10 has a unit mounting plate 13 in the side of the belt support element 1b.

Figure 4:
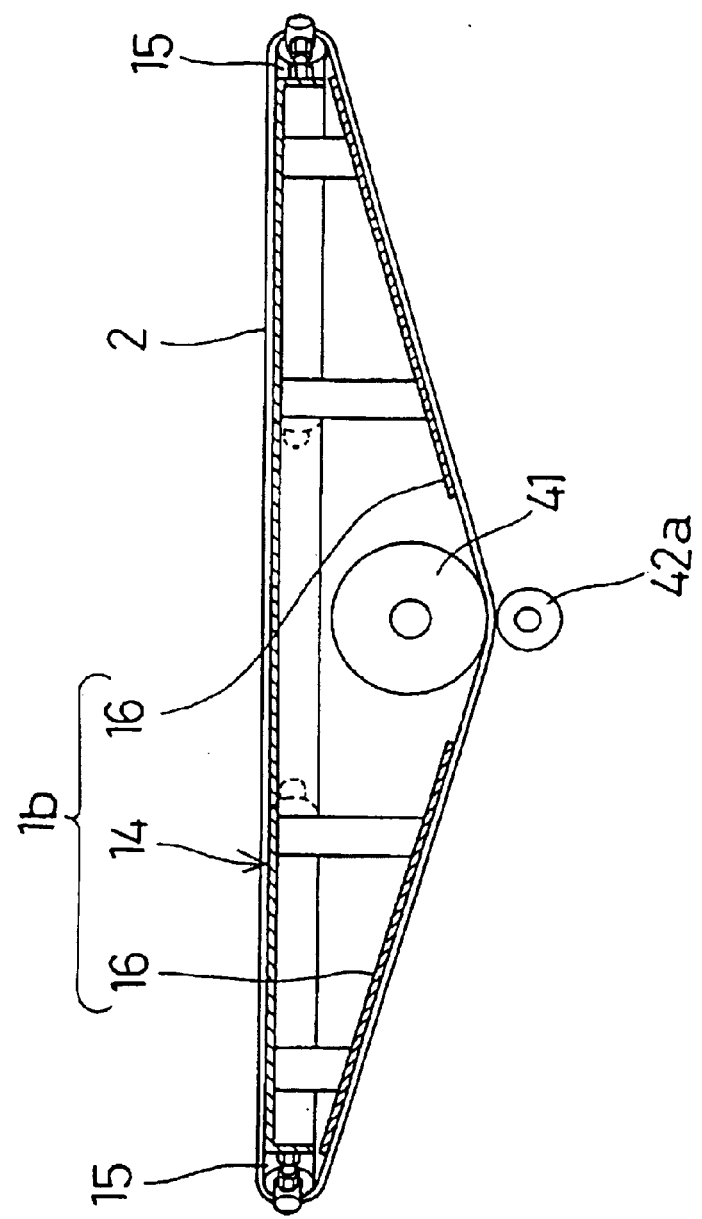
FIG. 4 is a view showing a state in which the beaded conveyor belt is stretched between the end rollers in the belt conveyor.

As shown in FIGS. 1, 3 and 4, the belt support element 1b includes a belt mounting plate 14 and two belt guide plates 16 and 16 which are fixed with a lower face of the belt mounting plate 14 through brackets. As shown in FIG. 2, the belt mounting plate 14 is bolted to the bracket portion 12. The belt mounting plate 14, as shown in FIG. 1, is formed in a pentagonal shape in a plane view. Bent pieces 14a and 14a provided at an angle of 90 degrees respectively receive straight end rollers 15 and 15 having a diameter of approximately 15 to 30 mm. As shown in FIGS. 1 and 3, the end roller 15 includes a stainless steel axial piece 15a bolted to the bent piece 14a and plural resin rollers 15b are attached rotatably on the axial piece 15a. A bearing or bearings 15c (having the same diameter as or a little larger diameter than the outer diameter of the roller 15b) are interposed between the resin rollers 15b and 15b provided near the outer peripheral side of the belt.

Figure 7:
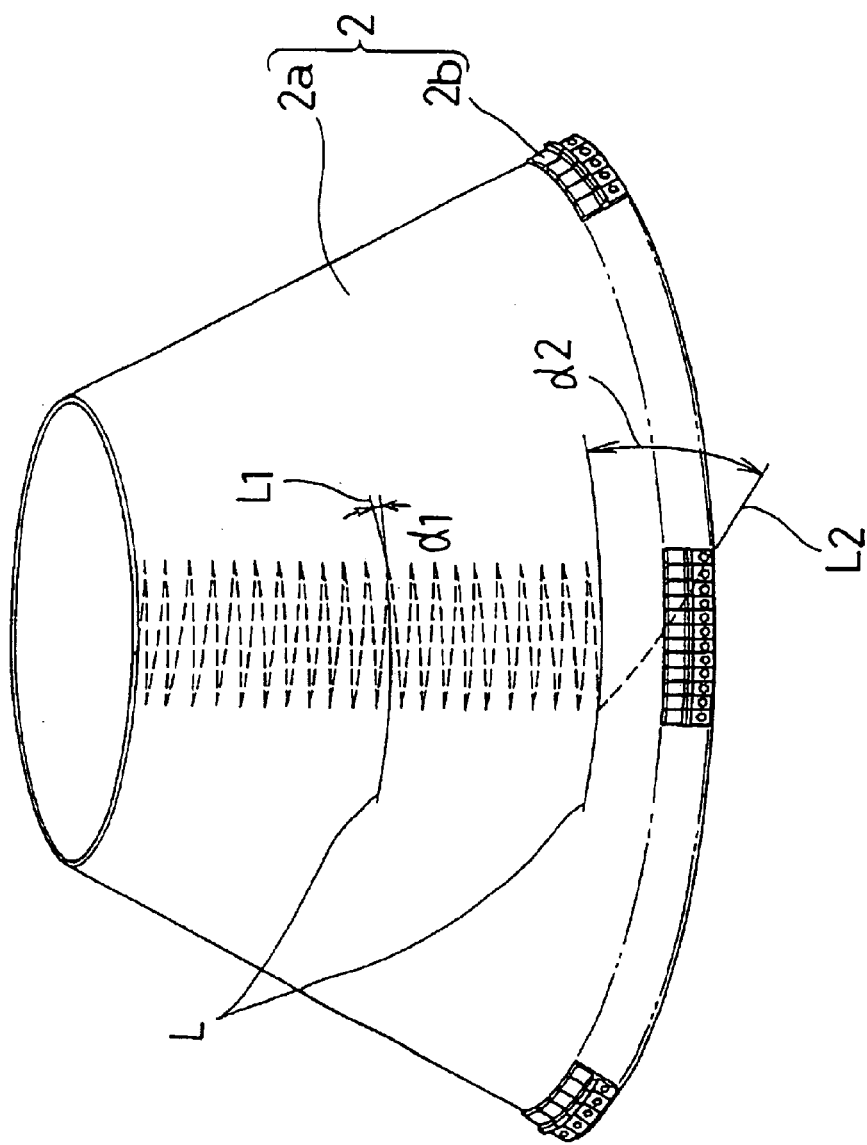
FIG. 7 is a perspective view of the conveyor belt with bead.

The beaded conveyor belt 2, as illustrated in FIGS. 1 and 7, includes a belt body 2a and a plurality of bead constituting elements with narrow width disposed across an entire outer peripheral end of the belt body 2a.

Figure 6:
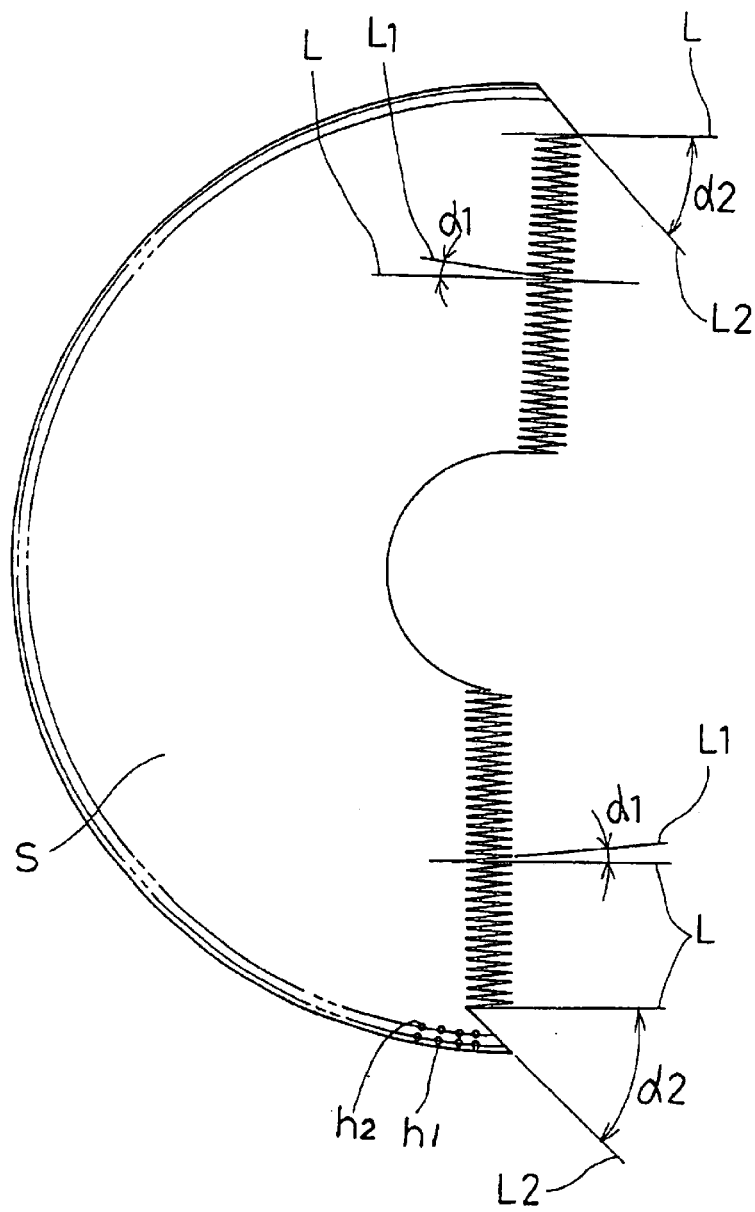
FIG. 6 is a plane view of a sheet for forming a belt body.

The belt body 2a has a polyester sail-cloth (canvas) as a core body thereof and a thermoplastic polyurethane as a surface material of a conveying face. Both ends of a fan-shaped sheet are joined together to make a tapered tube shape as shown in FIG. 7. In general, the belt body 2a of this type is formed by joining both of the ends of the fan-shape by a skiving joint or a step joint. This causes to increase the manufacturing cost, the number of the manufacturing steps and the thickness of the joining part. In order to prevent these drawbacks, here in the present invention, the belt body 2a is manufactured in the following ways (1) and (2):

(1) As shown in FIG. 6, a sheet S which has a polyester canvas as a core body and a thermoplastic polyurethane as a surface material of a conveying face is punched out into a fan shape with a Thompson blade. The sheet punched in a fan shape has end portions to be joined together. Each of the end portions is formed in fingers-like shape extending from the inner peripheral end up to near the outer peripheral end, and each of fingers has a narrow tip angle (an angle α1 between a cut line L1 of the finger and a tangent L to the belt peripheral direction line is small). The part from the portion to be caught and held by the driving roller 41 and the pinch roller 42a and the vicinity thereof up to the outer peripheral end is formed with a single cut line L2 having a large angle α2 with respect to the tangent L to the belt peripheral direction line. Furthermore, as shown in FIGS. 6 and 8, a plurality of through holes h1 and h2 for attaching a plurality of bead constituting elements 2b are provided near the outer peripheral end of the belt body 2a of the sheet S.

The canvas and the surface material of the sheet to form the belt body 2a are not limited to the above. The cut line L2 may be curved.

(2) The end portions of the sheet S to be joined together are meshed with each other as shown in FIG. 7. And a urethane sheet is applied on the thermoplastic polyurethane joined with fingers and heat and pressure are applied thereon. In consequence, urethane of the urethane sheet is melted to infiltrate into a gap or gaps present between the joining edges, so that the ends of the sheet S are joined together.

Figure 8:
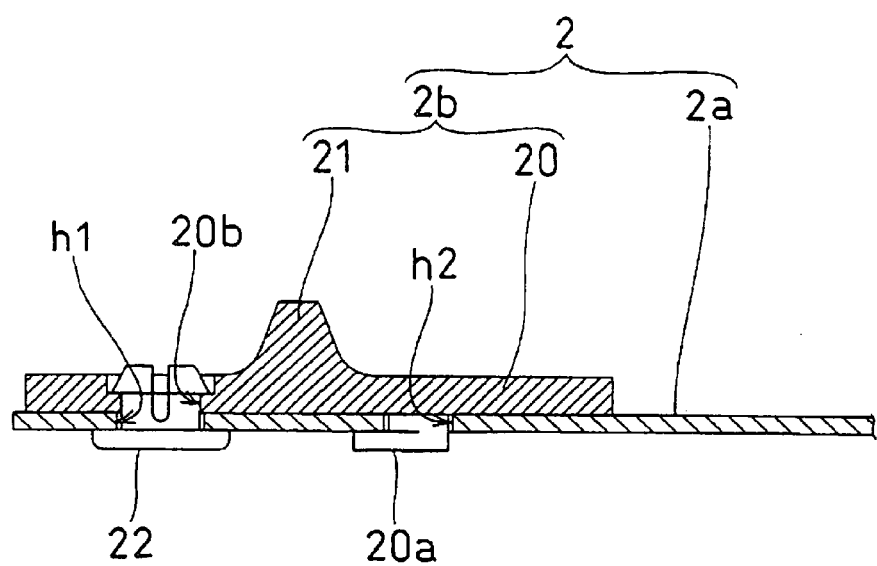
FIG. 8 is a sectional view showing a state in which a bead constituting element is attached on the belt body.

The bead constituting element 2b, illustrated in FIG. 8, includes a rectangular plate portion 20 and a thick portion 21 (or a projecting portion) provided on a longitudinal center portion of the plate portion 20 which has a substantially trapezoidal shape in a side view, and the portions 20 and 21 are integrally formed with synthetic resin or sintered metal. The plate portion 20 has an engaging part 20a at one side and an engaging hole 20b at the other side. When the bead constituting element 2b is attached on the belt body 2a, the engaging part 20a is fit into the through-hole h2, while a pin 22 is fit into the through-hole h1 and the engaging hole 20b, so that the bead constituting element 2b is fixed with the belt body 2a. Here, in the bead constituting element 2b, for example, the plate portion 20 may have an 8.5 mm width in the belt forwarding direction at the outer peripheral edge side of the belt, an 8 mm width in the belt forwarding direction at the inner peripheral edge side thereof, and a length of 30 mm. Furthermore, the thick portion 21 may have a height of 4 mm and the side face thereof has an inclination angle of 70°.

Figure 9:
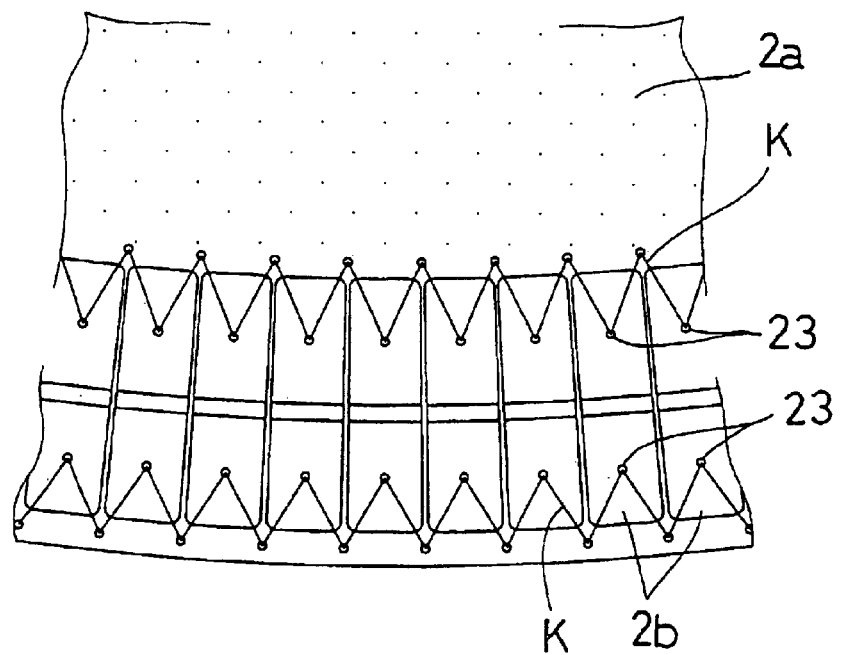
FIG. 9 is a sectional view showing another method for attaching bead constituting elements on the belt body.
Figure 10:
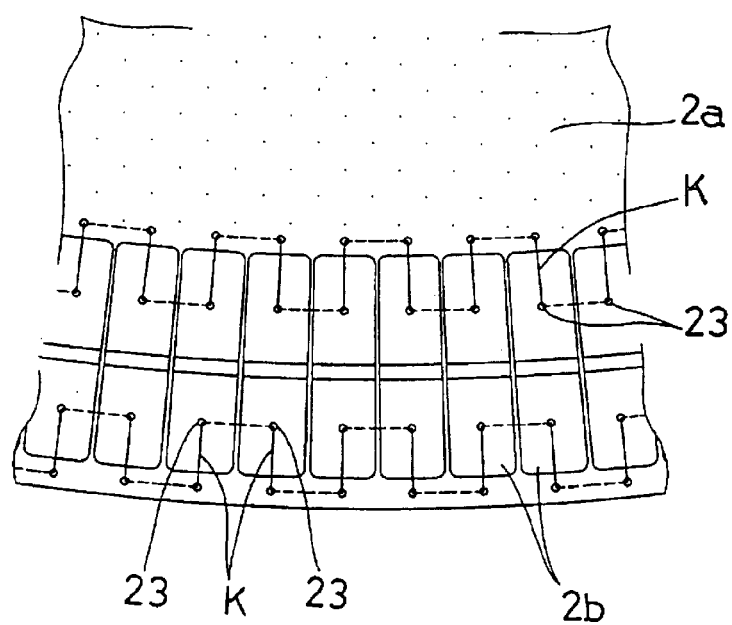
FIG. 10 is a sectional view showing another method for attaching bead constituting elements on the belt body.
Figure 11:
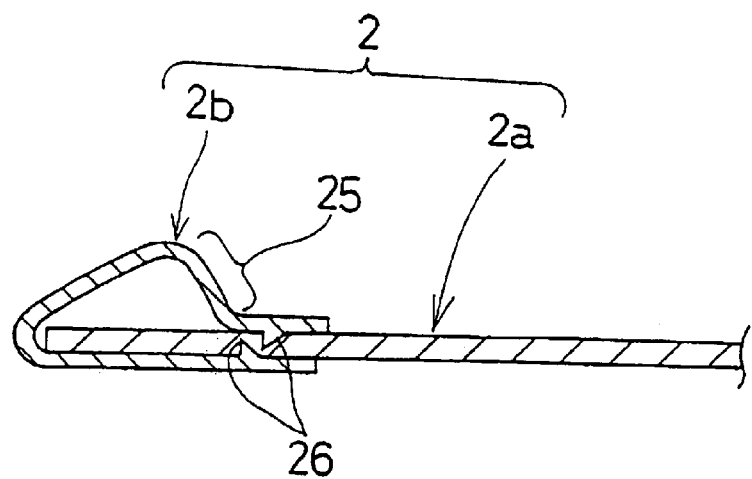
FIG. 11 is a sectional view showing another method for attaching bead constituting element on the belt body.

The way of attaching the bead constituting element 2b to the belt main body 2a is not limitative to the above. As shown in FIGS. 9 and 10, the bead constituting element 2b may be attached thereto with a thread K through a hole 23 formed on the bead constituting element 2b. Furthermore, a pressed plate structure as shown in FIG. 11 may be used as the bead constituting element 2b. In this bead constituting element 2b, a steel plate is bent to make a slant surface 25 which is in contact with the guide members 30, 31 and 31. This pressed plate structure is attached to the belt main body 2a with claws 26 which bite down the belt body 2a.

The bead constituting element 2b may be applicable if the width in the belt forwarding direction is as approximately 20 to 60% narrow as the diameter of a straight end roller which has a small diameter.

Figure 12:
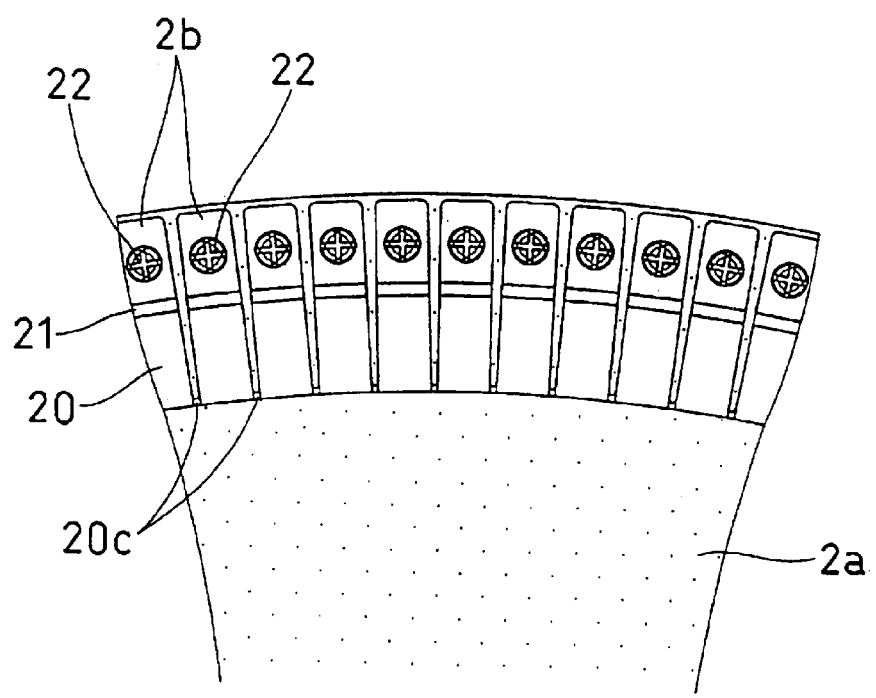
FIG. 12 is a plane view of bead constituting elements according to another embodiment.

The adjacent bead constituting elements 2b and 2b may be connected with each other through an elastic bendable thin piece 20c (integrally formed), as shown in FIG. 12.

Then, the bead constituting elements 2b may be detachable from the belt body 2a as described above, or may also be fixed thereto.

The shift prevention member 3, as shown in FIGS. 1 and 3, includes an upper side guide member 30, lower side guide members 31 and 31, a press member 32 and a screw 33. The press member 32 presses the upper side guide member 30 and the lower side guide members 31 and 31 against the slant surface of the thick portion 21 of the bead composing element 2b. The screw 33 is manually used for fixing the press member 32 with the upper side of the belt mounting plate 14 and the lower side of the belt guide plates 16 and 16.

Figure 5:
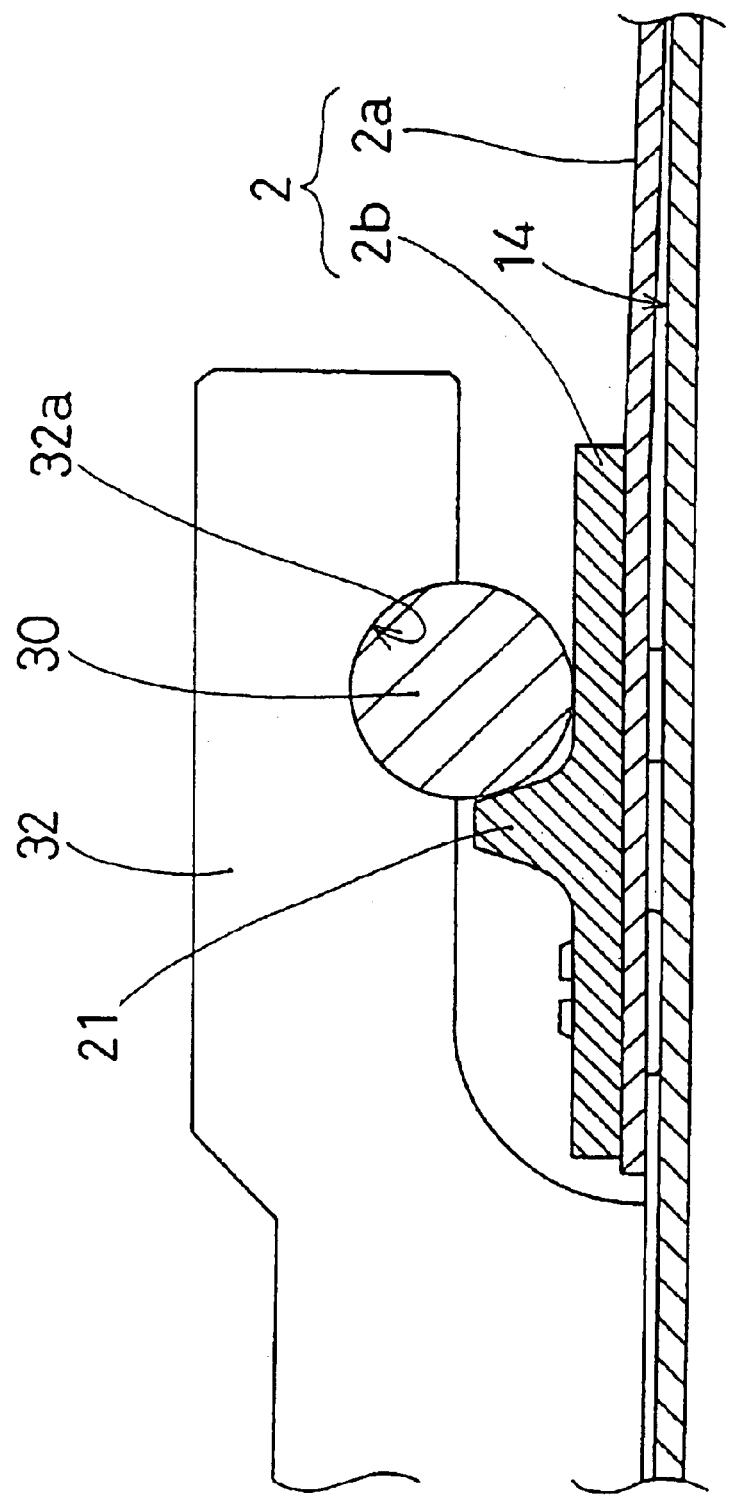
FIG. 5 is a sectional view showing a relation between a bead constituting element and a shift prevention member employed in the belt conveyor.

The upper side guide member 30, shown in FIGS. 1 and 5, is provided on the upper side of the belt mounting plate 14 to prevent the inward shift of the belt. The upper side guide member 30 is formed of a round bar having shortly tapered ends at the both ends, and shaped in an arc with a curvature radius to contact with the inner side slant face of the thick portion 21.

The lower side guide members 31 and 31, as shown in FIG. 3, are located on the under side of the belt guide plate 16 to prevent the inward shift of the belt. The lower side guide members 31 and 31 are made of round bars with shortly tapered ends and formed in an arc shape with a curvature radius to contact with the inner side slant face of the thick portion 21. The guide member, here, is divided in two 31 and 31, because the driving roller 41 and the pinch roller 42a are present there, as shown in FIG. 3.

The material of the upper and lower guide members 30, 31 and 31 is determined depending on the material of the bead composing element 2b. If one of them is synthetic resin, then the other must be metal. On the other hand, if one of them is sintered metal, the other may be metal.

The press member 32 is, as illustrated in FIG. 5, provided with a groove 32a with an arc section. FIG. 5 shows only the upper side guide member 30 and other parts therearound, however, the lower side guide members 31 and 31 and other parts therearound also have the same structure. The upper side of the upper guide member 30 and the lower sides of the lower guide members 31 and 31 are respectively received within the grooves 32a so that the guide members 30, 31 and 31 are positioned to stay therein in contact with the inner slant face of the thick portions 21.

The screw 33 is formed with a male screw fixed with a manually rotatable portion of a large diameter on one end. The upper side and the lower side guide members 30, 31 and 31 may be easily removed from the beaded conveyor belt 2, without using a tool, only by grabbing and rotating the manually rotatable portion of the screw 33.

The driving member 4, as shown in FIGS. 1 to 3, includes a motor 40 with a decelerator, the driving roller 41, the pinch roller unit 42 and a controller (not shown). The motor 40 is bolted to the mounting plate 10 of the motor supporting member 1a. The driving roller 41 is attached on the output shaft of the motor 40 with the decelerator. The pinch roller unit 42 is attached on the unit mounting plate 13. The controller is to change the rotation of the output shaft of the motor 40 with the decelerator by changing the frequency.

The pinch roller unit 42, as shown in FIGS. 2 and 4, holds the beaded conveyor belt 2 between the pinch roller 42a and the driving roller 41 to reliably rotate and drive the beaded conveyor belt 2 by the frictional engagement. This pinch roller unit 42 is constituted so as to adjust the force for holding the beaded conveyor belt 2 between the pinch roller 42a and the driving roller 41. Separation of the pinch roller 42a from the driving roller 41 allows to release the holding engagement of the beaded conveyor belt 2.

The motor 41 with the decelerator, the driving roller 41 and the controller are already known, and will not be described here in detail.

The cover 5 includes, as shown in FIGS. 1 and 2, an inner peripheral side cover 5a and an outer peripheral side cover 5b.

The inner peripheral side cover 5a, as shown in FIG. 1, is formed in a fan shape so as to cover the inner peripheral edge area of the beaded conveyor belt 2 and the vicinity thereof. The cover 5a is screwed to an upper portion 61a of the leg member 61 through a manually rotatable cover attaching screw 50 as shown in FIG. 2.

The outer peripheral side cover 5b, as shown in FIG. 1, is shaped so as to cover the outer periphery edge area of the beaded conveyor belt 2 and the vicinity thereof, i.e., formed in a shape to cover the bead constituting elements 21, the upper guide member 30, the press member 32, the screw 33, the motor 40 with the decelerator, the controller and the like. The cover 5b is attached to the vertical part 14b of the belt mounting plate 14 through a manually rotatable cover attaching screw 50.

The leg member 6, as shown in FIGS. 2 and 3, includes a leg portion 60 in an up-side-down T-shape formed by fixing a pillar 60a to the center of a horizontal beams 60b, a leg portion 61 made of one pillar, a horizontal beam 62 connecting the leg portion 61 and the pillar 60a, and foot portions 63, 63 and 63 with height adjustable screws attached on the both ends of the horizontal beam 60b and the bottom portion of the leg portion 61. The outer side portion of the belt having the motor 40 with the decelerator and the like is supported by the leg portion 60, while the inner side portion of the belt on the belt mounting plate 14 is supported by the leg portion 61.

Here, when the cover attaching screw 50 is removed, the upper portion 61a of the leg portion 61 can be rotated with a hinge T.

The beaded conveyor belt 2 is attached to the conveyor body 1 as shown in FIG. 4. The beaded conveyor belt 2 is stretched between the end rollers 15 and 15 so as to maintain a certain rotation track by the belt mounting plate 14, the two belt guide plates 16 and 16, the driving roller 41 and the pinch roller 42a.

Furthermore, as described above, the beaded conveyor belt 2 is stretched between the end rollers 15 and 15, and, in this state shown in FIGS. 1, 3 and 5, the inner slant faces of the thick portions of a number of bead constituting elements 2b (function as a bead member) on the belt 2 are in contact with the upper and lower guide members 30, 31 and 31.

Therefore, when the motor 40 with the decelerator is driven, the beaded conveyor belt 2 rotates as being caught and held between the driving roller 41 and the pinch roller 42a. And the bead constituting elements 2b forward sliding on the upper and lower side guide members 30, 31 and 31 in the above mentioned contact state therewith. Consequently, the beaded conveyor belt 2 is prevented from inward shifting. Namely, the bead member composed of a plurality of bead constituting elements 2b exhibits the same function as a continuously formed bead.

The beaded conveyor belt 2 may be removed from the conveyor main body 1 with the following steps (1) to (5).

(1) Release the manually rotatable screw 50 for mounting the cover, and remove the inner side cover 5a and the outer side cover 5b (2) Rotate the upper portion 61a of the leg member 61 with the hinge from a position shown by continuous line to another position shown by two-dot chain line in FIG. 2

(3) Loose the manually rotatable screw 33 to remove the upper and lower guide members 30, 31 and 31 received within the groove 32a from the press member 32

(4) Separate the pinch roller 42 away from the driving roller 41 to release the conveyor belt 2 being held therebetween (5) After the above steps (1) to (4), shift the beaded conveyor belt 2 from the outer peripheral side toward the inner peripheral side so that the beaded conveyor belt 2 may be removed from the conveyor main body 1

(6) When attaching the beaded conveyor belt 2 on the conveyor main body 1, take the above steps reversely As stated above, in the constitution of this beaded conveyor belt 2; (1) the bead member is composed of a number of bead constituting elements disposed on across the entire outer peripheral area of the belt main body 2a, (2) the width in the belt forwarding direction of each bead composing element 2b is as narrow as about 20 to 60% of the diameter of the straight end roller 15 having a small diameter, and (3) the adjacent bead constituting elements 2b and 2b are separated from each other or connected with a thin piece 20c.

Therefore, compared with a conventional beaded conveyor belt with one single bead, in the beaded conveyor belt 2 of the present invention, extremely less crack and/or breakage may occur in the bead constituting elements 2b, and thereby the belt 2 withstands the long time use.

When bead constituting elements 2b are attached detachably on the belt body 2a, for example, by using a pin, sewing, with an engagement by a claw or the like, if one or more of the bead constituting elements 2b are damaged, the one or more of them may be easily replaced. That is, even if a portion of the bead constituting elements 2b are damaged, the conveyor belt may be continuously used only by replacing the damaged bead constituting elements 2b.

Advantageous features of the belt body 2a are described below. The joint portion (end portions of the fan-shaped sheet S) is formed by one time press cut with a Thompson blade, and this allows to decrease the number of manufacturing steps and lower manufacturing cost.

Furthermore, the belt body 2a has a finger joint from the inner peripheral end to near the outer peripheral end, and a single line joint for the other area from the portion to be held between the driving roller 41 and the pinch roller 42a and the vicinity thereof up to the outer peripheral end, the latter joint being made by connecting cut lines L2 each of which has a large angle $\alpha 2$ with respect to the tangent L on the peripheral direction line of the belt. Therefore, twisting load due to the change in the peripheral speed by the driving roller 41, the belt body 2a and the pinch roller 42a and inwardly shifting force of the belt body 2a may be prevented by the shift prevention member 3. And, as a result, even if pull force in a width direction of the belt body 2a, peeling-off and breakage hardly occurs at a portion indicated with the numeral 27 of the belt body 2a.

The end portions of the fan-shaped sheet S are practically joined together with a finger joint, and the joined portion will not become thicker like those with the skiving joint or the step joint.

The effects of using the end roller 15 are as follows. The end roller 15, as shown in FIG. 1, is formed with the axial piece 15a and a number of resin rollers 15b rotatably provided thereon. And the bearing or bearings 15c (having the same diameter as or a larger diameter than the outer diameter of the resin roller 15b) are provided between the adjacent resin rollers 15b and 15b located on the belt outer peripheral side. Therefore, in the outer peripheral area of the belt where the peripheral speed of the belt body 2a is rather large, the belt body 2a forwards along with the rotation of the outer lace of the bearings 15c, while in the inner peripheral area of the belt where the peripheral speed of the belt body 2a is small, the belt body 2a forwards along with the rotation of the resin rollers 15b. Therefore, in the outer peripheral area with a larger peripheral speed, harsh frictional noises may be extremely suppressed (or eliminated) as compared with the case using end rollers having no bearing 15c.

Figure 13:
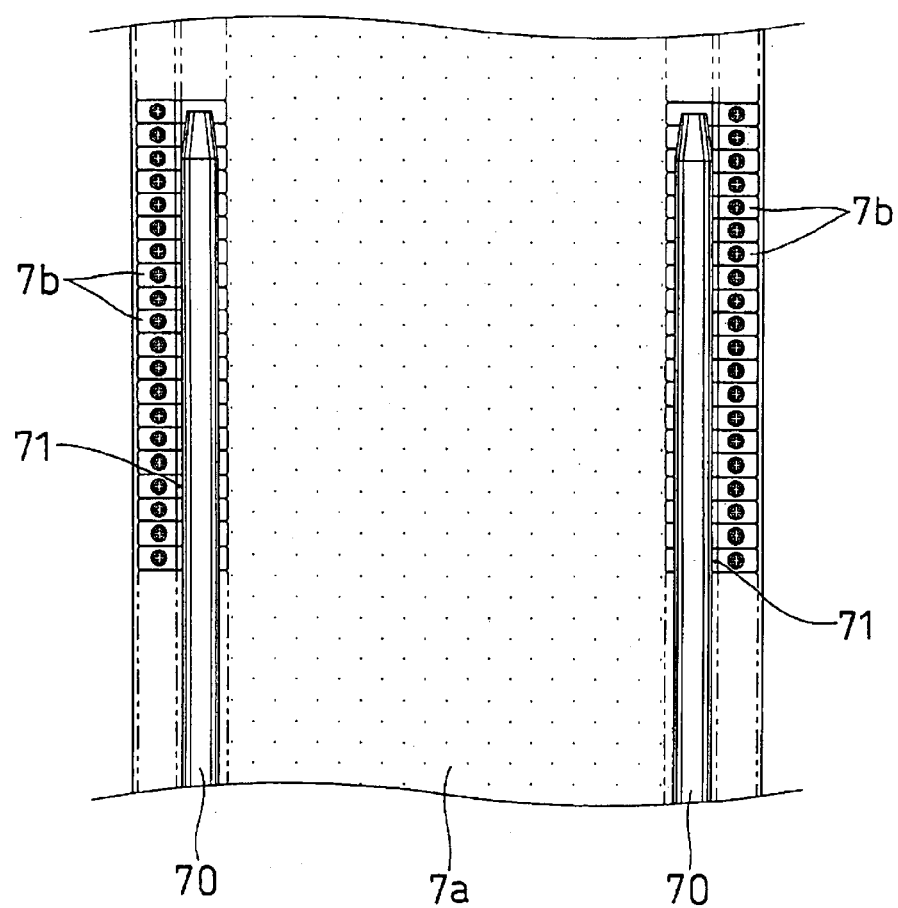
FIG. 13 is a plane view showing a state in which bead constituting elements are provided or fixed on both sides of a linear conveyor belt.
Figure 14:
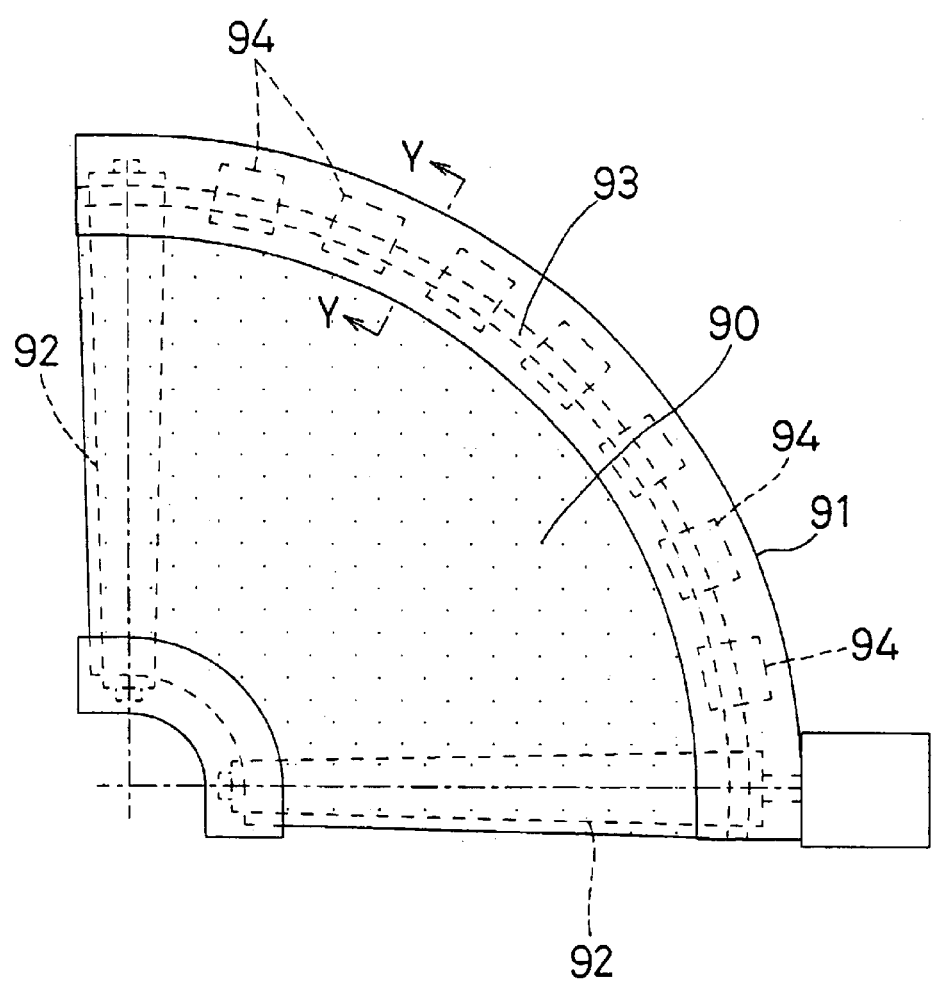
FIG. 14 is a plane view of a conventional curved conveyor.
Figure 15:
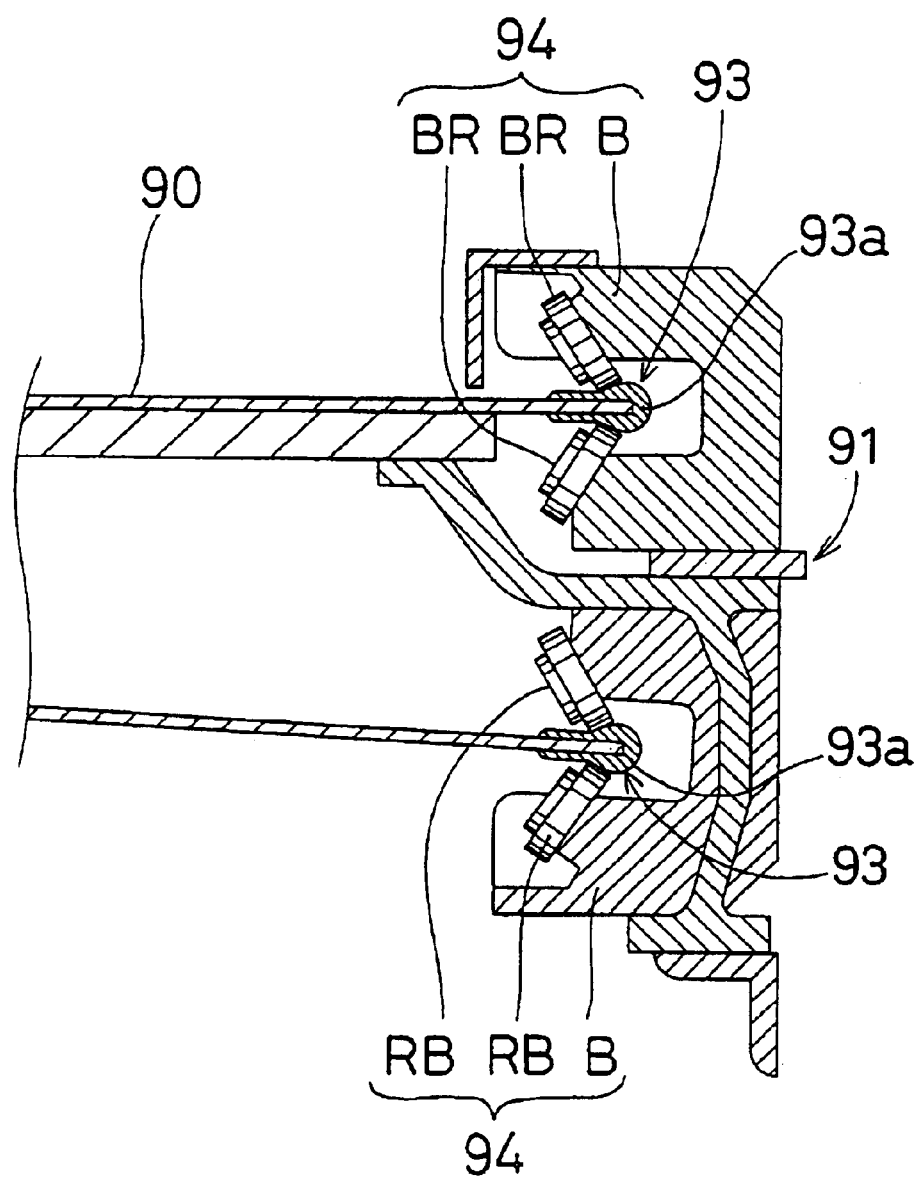
FIG. 15 is a sectional view of FIG. 14 taken along the line Y—Y.

In the above embodiment, the present invention is applied to a curved conveyor belt, but not limitative thereto. Another embodiment is shown in FIG. 13 in which the present invention is applied to a linear conveyor. A belt body 7a of the linear conveyor has a plurality of bead constituting elements 7b, which have a similar structure to that of the foregoing bead constituting elements 2b, at both ends. Straight guide members 70 and 70 are disposed on the conveyor body in contact with the inside slant faces of thick portions 71 and 71 of the bead constituting elements 7b and 7b. In this structure, not only meander forwarding of the bolt body 7a may be prevented, but also, if one or more of the bead constituting elements 7b are damaged, replacement of the damaged bead constituting elements and restoration of the system could be easily done.

In the foregoing embodiments, the thick portions 21 of the bead constituting elements 2b are shaped in a trapezoid in a side view. The shape is not limitative thereto, but may be rectangular, square, triangle or the like.

Having the construction stated above, the present invention may provide a beaded conveyor belt in which only a damaged portion may be easily replaced.

What is claimed is:

1. A beaded conveyor belt comprising:
   a belt body which is stretched between end rollers of a conveyor disposed apart at a certain angle;
   a plurality of bead constituting elements which are separable from each other and detachably disposed along at least part of an outer peripheral end part of the belt body; and
   the belt body which is prevented from an inward shift through an engagement between the bead constituting elements and a guide member of the conveyor which is made of a round bar shaped in an arc.

2. The beaded conveyor belt according to claim 1, wherein the bead constituting elements are attached on the belt body by one of ways of pinning, sewing and an engagement with a claw.

3. The beaded conveyor belt according to claim 2, wherein any adjacent bead constituting elements are connected with a thin piece.

4. The beaded conveyor belt according to claim 1, wherein any adjacent bead constituting elements are connected with a thin piece.

5. The beaded conveyor belt according to claim 1, wherein each of the bead constituting elements is made of a plate portion and a thick portion formed on the plate portion and the inward shift of the belt body is prevented due to slidable contact between an inner face of the thick portion and the guide member positioned by a press member.

6. The beaded conveyor belt according to claim 5, wherein the bead constituting elements are attached on the belt body by one of ways of pinning, sewing and an engagement with a claw.

7. The beaded conveyor belt according to claim 5, wherein any adjacent bead constituting elements are connected with a thin piece.

8. The beaded conveyor belt according to claim 5, wherein the inner face of the thick portion is slidable contact with the guide member which is positioned by the press member fixed with a screw to a belt mounting plate and a belt guide plate.

9. The beaded conveyor belt according to claim 8, wherein the bead constituting elements are attached on the belt body by one of ways of pinning, sewing and an engagement with a claw.

10. The beaded conveyor belt according to claim 8, wherein any adjacent bead constituting elements are connected with a thin piece.

11. The beaded conveyor belt according to claim 8, wherein each of the bead constituting elements has a length in a direction toward an inner peripheral end part and a width in a forwarding direction of the outer peripheral end part, and the width is smaller than the length.

12. The beaded conveyor belt according to claim 11, wherein any adjacent beaded constituting elements are connected with a thin piece.

13. The beaded conveyor belt according to claim 11, wherein the bead constituting elements are provided on an entire outer peripheral end part of the belt body.

14. The beaded conveyor belt according to claim 8, wherein the bead constituting elements are provided on an entire outer peripheral end part of the belt body.

15. The beaded conveyor belt according to claim 5, wherein each of the bead constituting elements has a length in a direction toward an inner peripheral end part and a width in a forwarding direction of the outer peripheral end part, and the width is smaller than the length.

16. The beaded conveyor belt according to claim 15, wherein any adjacent beaded constituting elements are connected with a thin piece.

17. The beaded conveyor belt according to claim 15, wherein the bead constituting elements are provided on an entire outer peripheral end part of the belt body.

18. The beaded conveyor belt according to claim 5, wherein the bead constituting elements are provided on an entire outer peripheral end part of the belt body.

19. The beaded conveyor belt according to claim 1, wherein each of the bead constituting elements has a length in a direction toward an inner peripheral end part and a width in a forwarding direction of the outer peripheral end part, and the width is smaller than the length.

20. The beaded conveyor belt according to claim 19, wherein the bead constituting elements are attached on the belt body by one of ways of pinning, sewing and an engagement with a claw.

21. The beaded conveyor belt according to claim 19, wherein any adjacent beaded constituting elements are connected with a thin piece.

22. The beaded conveyor belt according to claim 19, wherein the bead constituting elements are provided on an entire outer peripheral end part of the belt body.

23. The beaded conveyor belt according to claim 1, wherein the bead constituting elements are provided on an entire outer peripheral end part of the belt body.

24. The beaded conveyor belts according to claim 23, wherein any adjacent bead constituting elements are connected with a thin piece.

* * * * *